United States Patent [19]

Gantner

[11] Patent Number: 4,607,791
[45] Date of Patent: Aug. 26, 1986

[54] HYDRONIC ROOM HEATING DEVICE

[76] Inventor: Phillip E. Gantner, 173 Lake Shore Dr., Box 573, Hammonton, N.J. 08037

[21] Appl. No.: 678,293

[22] Filed: Dec. 5, 1984

[51] Int. Cl.⁴ .......................... F24H 3/00; F24C 1/00
[52] U.S. Cl. ..................................... 237/71; 126/435; 126/436; 237/70; 165/50
[58] Field of Search ............... 126/431, 430, 436, 417, 126/435; 237/70–74, 76, 79; 165/48 S, 49, 50, 53, 56, 168

[56] References Cited

U.S. PATENT DOCUMENTS

| | | | |
|---|---|---|---|
| 410,844 | 9/1889 | Martin | 237/76 |
| 1,570,316 | 1/1926 | Palermiti | 237/70 X |
| 1,776,080 | 9/1930 | Murray | 237/70 X |
| 2,731,242 | 1/1956 | Borg et al. | 237/79 X |
| 2,783,639 | 3/1957 | Werner | 237/69 X |
| 2,784,945 | 3/1957 | Fodor | 237/69 X |
| 4,069,973 | 1/1978 | Edwards | 237/69 |
| 4,314,547 | 2/1982 | Wash | 237/70 X |

FOREIGN PATENT DOCUMENTS 53725  1/1943  Netherlands .................... 276/76

Primary Examiner—Larry Jones
Attorney, Agent, or Firm—Thomas A. Lennox

[57] ABSTRACT

A hydronic room heating device in the form of a baseboard heating panel of air entrained concrete with concrete radiating fins molded on the back of the panel with an upper concrete heating element section positioned to allow air flow past the fins upwardly and out through the opening between the upper element and the panel using low temperature heated water from solar heated systems.

14 Claims, 9 Drawing Figures

HYDRONIC ROOM HEATING DEVICE

BACKGROUND OF THE INVENTION

This invention involves a hydronic room heating device to heat the surrounding air during cool weather to improve the habitability of the room and includes radiating heating elements used in residental property and in industrial and commerical buildings.

Radiant baseboard heating is almost universally installed as copper pipe positioned horizontally along the baseboard, typically on an outside wall, with radiating copper fins connected along the length of the copper pipe. Cast iron sections are offered but are very expensive, need specialized tools to install and are virtually irrepairable if damaged.

Solar hot water heating systems provide an inexpensive source of hot water and are usually used in conjunction with a fuel fired primary heating system. The solar systems are particularly effective in supplying large quantities of water heated to a moderate temperature which is relatively ineffective in the "quick heat release" copper pipe and fin system in the present homes. In high travel areas particularly in industrial settings, the copper tube and fin construction is too fragile and is easily damaged. The cast iron system are more durable, but are not practical in industrial settings. There is a need for a virtually indestructible hydronic heating element system that bridges the gap between the fuel fired primary heating systems and solar water heating panel systems.

While a number of radiator systems have been suggested, none satisfy the above needs or attain the objects listed herein below. Prior systems are described in U.S. Pat. Nos. 899,078 by H. Salmon, 1,041,879 by G. Ruffier, 765,476 by R. Goodwin, Jr., 233,428 by T. M. Morton.

SUMMARY OF THE INVENTION

It is the object of this invention to provide a hydronic room heating device that will retain heat and provide a relatively even and steady radiation of heat from the water source.

It is an additional object of the present invention to provide a hydronic room heating device that eliminates expansion problems associated with the metal pipe and fins.

It is a further object of this invention to provide a hydronic room heating device that operates effectively at lower water temperatures and thus offer fuel savings.

It is a particular object of this invention to provide a baseboard heating system that is compatible with solar panels and bridges the gap between primary heating system and solar back-up panels.

It is an object of this invention to provide a hydronic baseboard heating device that requires no specialized tools to install and may be installed as an replacement for the present baseboard heating products.

It is a particular object of this invention to provide a durable, essentially indestructible baseboard heating device that may be used in high traffic or in security areas such as prison cells or mental hospitals.

It is an additional object of this invention to provide a hydronic room heating device which is shaped from a liquid cementous compound and formed in any shape or form to suit the particular need of the application and the particular aesthetic result desired.

It is a further object of the present invention to provide a hydronic room heating device that may be supplied in a variety of textures and patterns, molded into the device so that the affect is essentially indestructible.

It is an additional object of the present invention to provide a hydronic room heating device that uses low cost material and has a low manufacturing cost.

It is an additional object of the present invention to provide a hydronic room heating device that provides for good air flow circulation around the device to transport heat to the air flow.

It is an additional object of the present invention to provide a hydronic room heating device that is easily vented and trained.

It is an additional object of the present invention to provide a baseboard heating device that may be attached directly to the wall or may rest on the floor.

This invention is a hydronic room heating device used in a room having the standard floor and walls enclosing a space. The device includes a heat radiating panel constructed of a cementous compound, preferably air entrained concrete. The term "cementous compound" as used throughout is defined as a nonhomogeneous material bound by a cement having a low thermal conductivity constant. Although metal reinforcement may be used and metal additives may be added to increase the heat conduction characteristics of the panel in a particular direction, the bulk of the panel is composed of mineral compounds including silica, silicates, other rocks and water insoluble salts to form a strong, low thermal conductive panel. The cementous compound preferably has a thermal conductivity constant in the range of 0.3 to 5.0 B.t.u/(hr.)(sq.ft.)(°F./ft.). The cementous compound includes but is not limited to the standard Portland concrete mix, reinforced concrete, synthetic stone, including synthetic marble formed of organic polymeric binders including epoxy and acrylic polymers and includes various size, color and textured stone entrainment to provide physical as well as aesthetic properties and includes mixes containing relatively high heat conducting materials so that the heat conduction through the body of the panel may be adjusted to meet particular needs. An air radiating device constructed of the cementous compound is in heat conduction relationship with the heat radiating panel and is positioned to receive air flowing past the air radiating device to heat the air flowing into the room. The heat radiating device is preferrably heat radiating fins molded of concrete in an unitary construction in heat conduction relationship with the radiating panel and are positioned in vertical alignment with the troughs between the fins opening downwardly below the panel and upwardly above the panel. A holding device holds the panel above the floor of the room and preferrably the fins facing a wall of the room. A transport piping device is embedded, preferably horizontally in the panel to carry heated liquid in conduits through the panel and transmit heat to the panel.

It is preferred that there be an upper radiating element connected to the panel abutting the wall positioned horizontally above the top of the panel and leaving a space between the top of the panel and the bottom of the upper element opening the top of the fin troughs to the front of the panel. The preferred transport piping device includes a plurality of pipes embedded horizontally in the panel extending the length of the panel and opening at both ends of the panel. It is preferred to have headers at each end of the panel to attach to the open ends of the transport piping device to distribute hot liquid to one end of the panel and to collect the cooled water at the other end of the panel.

BRIEF DESCRIPTIONS OF DRAWINGS

DESCRIPTION OF THE PREFERRED EMBODIMENTS

The device of this invention and in particular the baseboard heating element illustrated below is compatible with solar heated water systems. The long heat retention of the heating device reduces the need for a large holding tank for the hot water system heated by solar energy. Because of the slower, more even heat dissipation from the room heating device, energy from the solar heated water may be conveyed more immediately to the room heating device.

As pictured throughout the specification, the panel is shown constructed in the form of a baseboard heating panel, but it need not be so limited as to size and shape. For example, a panel may be constructed to fit between the studs in a home into the wall, with wall panels abutting the heat radiating panel from the sides and from above. In that particular embodiment, the panel would be about 14½ inches wide and may be as high as 2 or 3 feet. Air enters through apertures close to the base of the panel traveling upwardly through heat radiating passageways to be discharged back into the room at a heated temperature. The use of the cementous compound may allow the heating device to part of the aesthetic decoration in the room, shaped to suit the particular style and to provide a second function such as the rim of a pool or a fountain, a simulated railing decoration or the like. The cementous compound used to construct the unitary heating devices described below are molded of a standard concrete mix including cement, gravel, sand and water. The cement is a calcined mix of clay, limestone and other materials that will harden upon setting in contact with water. It should be understood that the cement may be inorganic or may be organic including a epoxy resin, acrylic resin and other plastics having a medium to high heat resistence. It is preferred that the cementous compound contain at least half gravel and sand and the metallic content be less than 10% of the total weight. The cementous compound is preferrably of low thermal conductivity as compared to copper or even cast iron which is presently used in heating elements. The cementous compound preferably has a thermal conductivity constant (k) in the range of 0.3 to 5.0 B.t.u./(hr.)(sq.ft.)(°F./ft.). A more preferred range of "k" is 0.45 to 2.5 and the most preferred range is 0.45 to 1.0. It is preferred that the cementous compound contain a majority of mineral compound of a mixture of silica and silicates.

Figure 1:
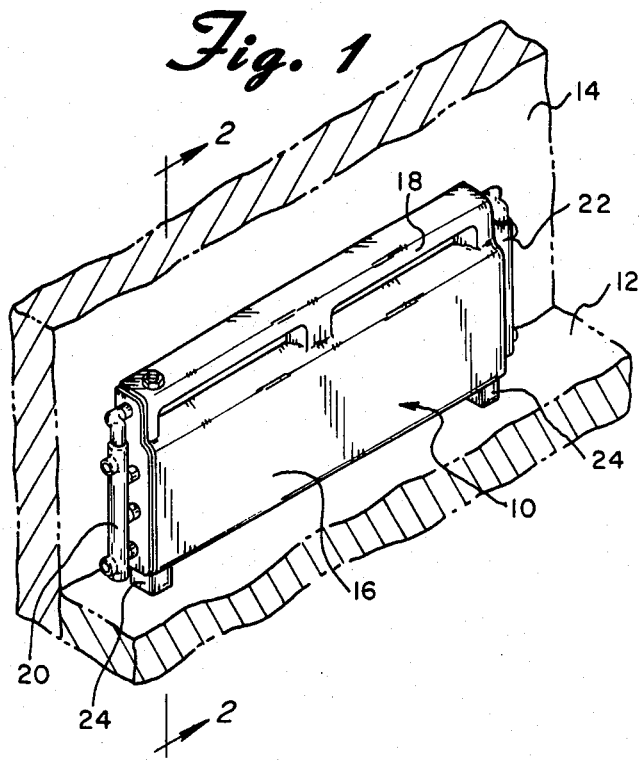
FIG. 1 is a perspective view of a hydronic room heating element of the present invention.
Figure 2:
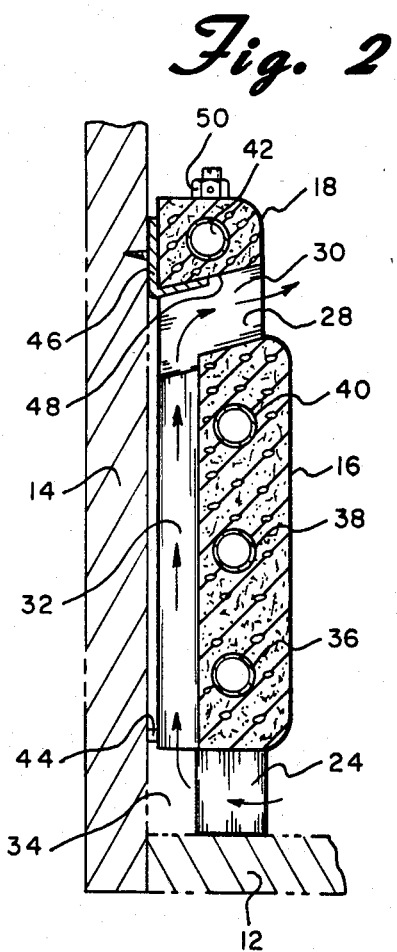
FIG. 2 is a cross-sectional view taken along lines 2—2 of FIG. 1.
Figure 3:
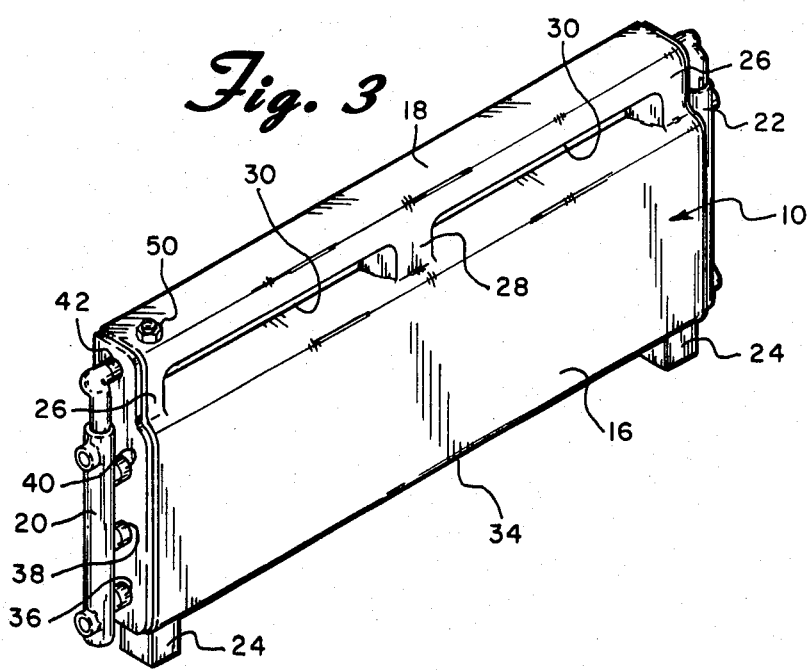
FIG. 3 is an enlarged perspective view of the device pictured in FIG. 1.

A baseboard hydronic room heating device 10 is illustrated in FIG. 1 sitting on floor 12 and positioned against wall 14. Radiating panel 16 may be supplied in various lengths, possibly in one foot increments from about two feet to about 10 feet in length. And as illustrated here panel 16 is about seven inches high but may vary greatly. Upper radiating element 18 is cast as a unitary piece of air entrained concrete together with panel 16. Standard metal hot water headers 20 and 22 connect to the hot water source, to the cooler water return to the circulation system or to multiple heater devices 10 end to end along the length of the wall. Heater device 10 is supported by legs 24 which rest on floor 12. The detail of heater 10 is further illustrated in the cross-sectional view of FIG. 2 and the enlarged view of FIG. 3. In the cross-sectional view, upper element 18 is supported by vertical concrete end sections 26 and center vertical section 28 which are part of the one piece molded concrete connecting upper element 18 and panel 16. Internal reinforcement in the concrete may be used, but is not illustrated in the drawings. This construction of heater 10 provides for horizontal air transport spaces 30 providing essentially unobstructed air flow from the back of panel 16 to the room. Fins 32 are part of the concrete casting extending from the back of panel 16 and extending toward wall 14 and as will be further illustrated below. Troughs between fins 32 provide substantial air flow area vertically from space 34 under panel 16 upwardly to opening 28 and outwardly into the room. Thus, convection air flow draws cooler air through floor space 34 past fins 32, through upper space 30 and expels it into the room as heated air.

Header 20 receives hot water from the heating system and distributes hot water at 140° F to half inch copper pipes 36, 38, 40 and 42 which are embedded in concrete and extend horizontally the length of panel 16 and the length of upper element 18 which are each in turn connected to header 22 which returns the cooled water to the return of the circulation system. Stop 44 holds fins 32 off of wall 14. An alternative attachment system is illustrated using clip 46 which is essentially an "L" shaped member screwed to wall 14 with one leg of the "L" shape extending outwardly from the wall and hooking under bottom edge 48 to support the entire heating device 10. Actually, when clip 46 is used, legs 24 may be eliminated and visa versa. Air vent 50 is connected to pipe 42 to allow air venting of the system after installation. Heating device 10 may be drained in the same fashion that present baseboard heaters are drained.

Figure 4:
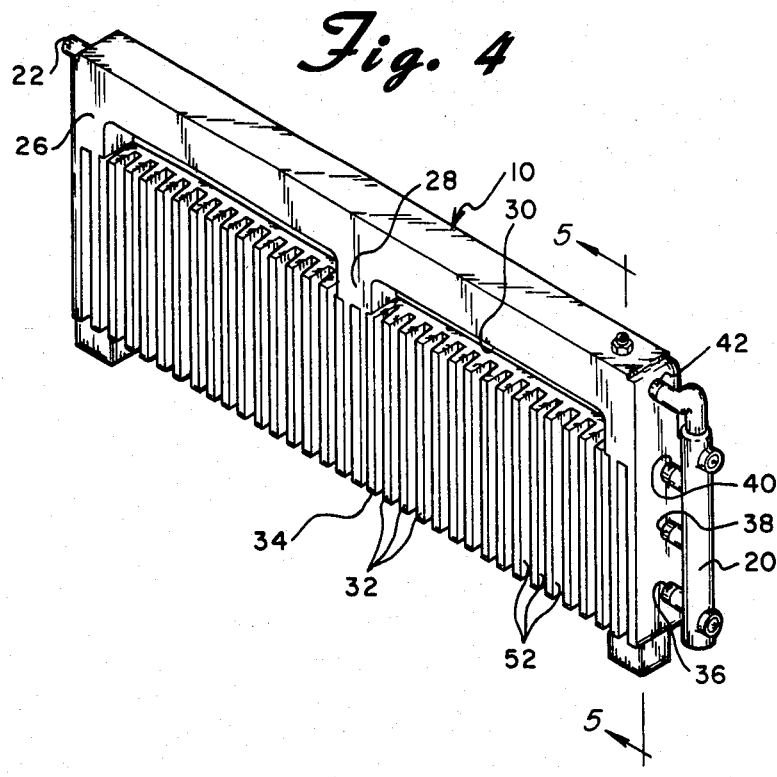
FIG. 4 is a perspective view looking at the rear of the device illustrated in FIG. 1.
Figure 5:
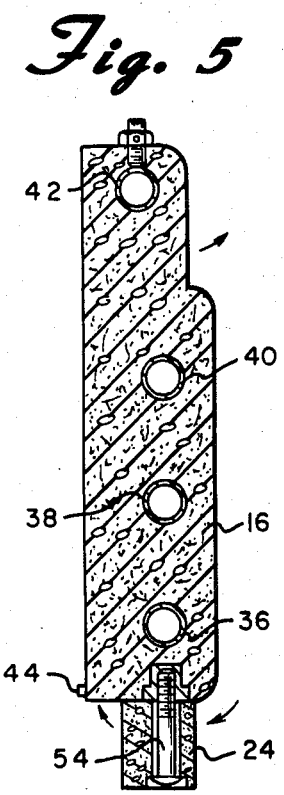
FIG. 5 is cross-sectional view taken along lines 5 of FIG. 4.

In FIG. 4, fins 32 are illustrated which effectively conduct heat from panel 16 and transmit it to the air passing through trough 52 which extend vertically between the fins to open the air flow from space 34 near the floor to space 30 between panel 16 and upper element 18. Upward flow is facilitated by bottom 48 of upper element 18 which slopes upwardly away from wall 14 so that space 30 is angled upwardly from the horizontal toward the front of heating device 10. The cross sectional view of FIG. 5 illustrates attachment of leg 24 with bolt 54 into the body of panel 16. Air flow in this drawing and in the other drawings is depicted by the arrows.

Figure 6:
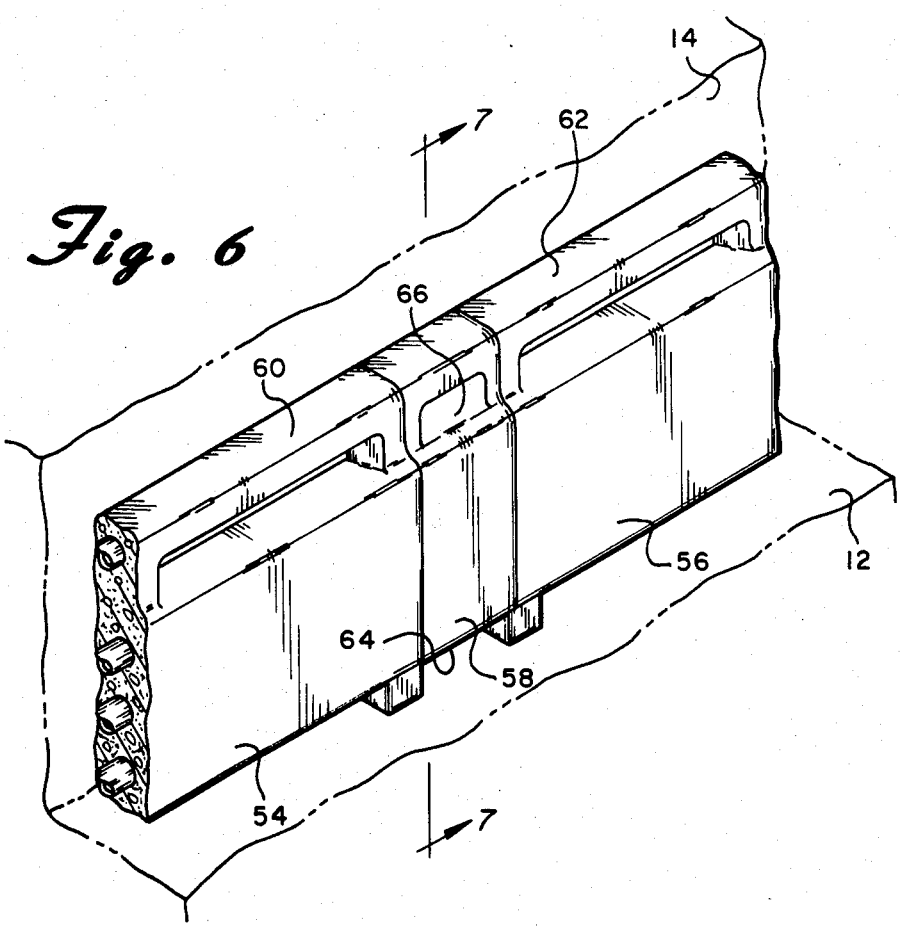
FIG. 6 is a cut-away sectioned perspective view of two hydronic room heating elements joined together.
Figure 7:
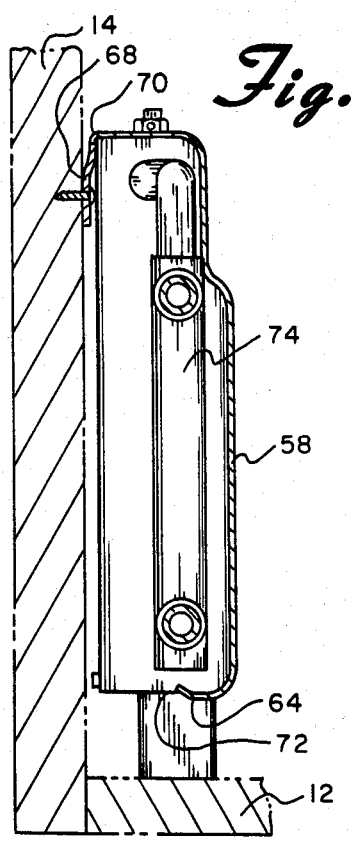
FIG. 7 is a cross-sectional view taken along lines 7—7 of FIG. 6.

In FIG. 6, baseboard heating devices 54 and 56 are joined in series through a pair of headers hidden by cover plate 58, a shaped metal panel curved to fit over the top of upper element 60 and 62 and spring snap under the bottom of the front panels on end 64. Depressed area 66 simulates the air flow holes of devices 54 and 56. Standard wall clips 68 fixed to wall 14 extend vertically and receive downward lip 70 of cover plate 58. In this cross sectional view upward turned end 64 of cover plate 58 is shown engaging a depression on bottom 72 to cover header 74.

Figure 8:
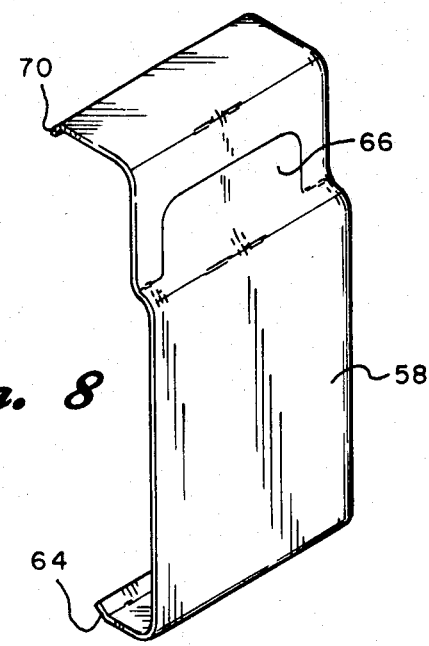
FIG. 8 is a perspective view of a cover plate used at the joining of the devices in FIG. 6.
Figure 9:
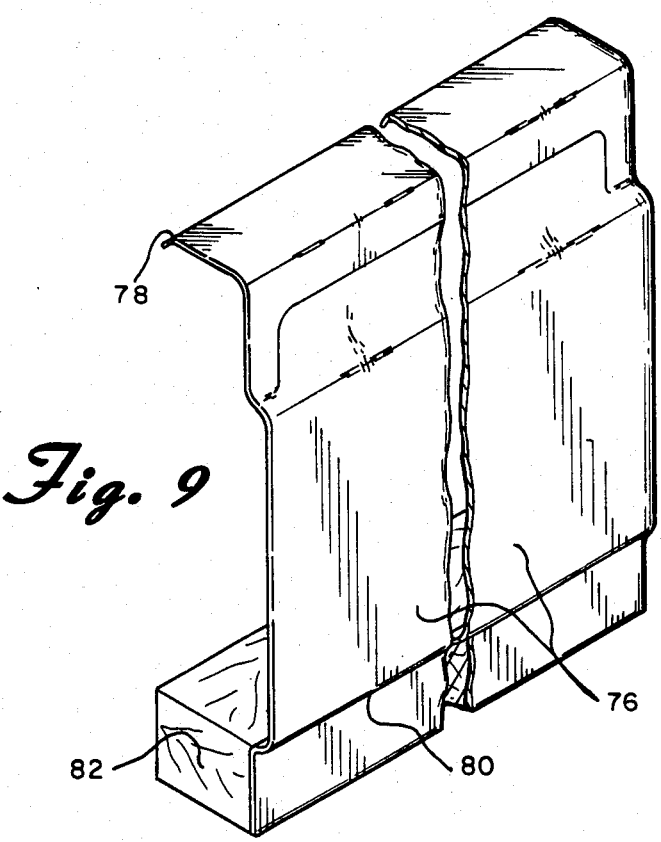
FIG. 9 is an extender plate used with the devices of the present invention.

In FIG. 8, cover splice plate 58 is shown removed from its position covering the ends and joining devices 54 and 56. Plate 58 is formed of one metal sheet and may be snapped on and off to reach the headers or for cleaning. Extender cover plate 76 is illustrated broken in FIG. 9 to slow that these cover plates may be used over any length between baseboard heating devices or may extend from the end of the heating device to a wall providing continuous line. Plate 76 is formed from a single sheet of metal extending over the top of the baseboard heating devices and engaging clip 68 or the back of the heating devices with downward extending lip 78. At the bottom, bend 80 curves inwardly to at least the horizontal and than extends downwardly toward the floor level. That lower vertical section is attached to block 82 extending a length of cover plate 76. This extender plate effectively hides water pipes extending out of the room toward other headers and is supported by the floor.

While this invention has been described with reference to the specific embodiments disclosed herein, it is not confined to the details set forth and the patent is intended to include modifications and changes which may come within and extend from the following claims.

I claim:

1. A hydronic room heating device for a room having a floor and walls;
   (a) a heat radiating panel constructed of a cementous compound,
   (b) air radiating means constructed of the cementous compound comprising fins in unitary construction with and in heat conduction relationship with the heat radiating panel the fins being in vertical alignment with troughs between the fins opening downwardly below the panel and upwardly above the panel with the fins facing a wall and positioned to receive air flowing past the air radiating means and heat the air flowing into the room,
   (c) holding means to hold the panel above the floor, and
   (d) transport piping means embedded in the panel to carry heated liquid in conduits through the panel and conduct heat to the panel.

2. The device of claim 1 wherein the room heating device is a baseboard panel of a length to extend a substantial distance along a wall.

3. The device of claim 1 wherein an upper radiating element is connected to the panel, positioned horizontally above the top of the panel leaving a space between the top of the panel and the bottom of the upper element with the space opening the top of the fin troughs to the front of the panel.

4. The device of claim 1 wherein the cementous compound has a thermal conductivity constant in the range of 0.3 to 5.0 B.t.u./(hr.)(sq.ft.)(°F./ft.).

5. The device of claim 1 wherein the cementous compound comprises a major portion of silica and silicate mineral materials bound with a cement to yield a panel with a low thermal conductivity constant.

6. The device of claim 1 wherein the cementous compound is air entrained concrete.

7. The device of claim 1 wherein the transport piping means is a plurality of pipes embedded horizontally in the panel extending the length of the panel and opening from both ends of the panel.

8. The device of claim 1 wherein header means are connected to the conduits at each end of the panel to distribute heated water to one end of the transport piping means and to accumulate that water at the other end of the transport piping means to return the water to the distribution system of a hot water source.

9. A hydronic room heating device, wherein the room has a floor and walls, comprising:
   (a) a heat radiating panel constructed of a cementous compound,
   (b) heat radiating means comprising heat radiating fins in unitary construction with and in heat conduction relationship with the radiating panel wherein the fins are positioned on a back side of the panel in vertical alignment with troughs between the fins opening downwardly below the panel and upwardly above the panel to radiate heat to air the flowing by convection past the radiating means, and
   (c) an upper radiating element connected to the panel positioned horizontally above a top of the panel and leaving a space between the top of the panel and the bottom of the upper element with the space opening the front of the panel to the top of the heat radiating means allowing the air convection to flow out of the space toward the front of the panel.

10. The device of claim 9 wherein the cementous compound is air entrained concrete.

11. The device of claim 9 wherein a holding means is provided to hold the panel above the floor of the room with the heat radiating means facing a wall.

12. The device of claim 9 wherein heat to the panel is provided through a transport piping means embedded in the panel to carry heated liquid in conduits through the panel conducting heat to the panel.

13. The device of claim 9 wherein the transport piping means comprises a plurality of pipes embedded horizontally in the panel, extending the length of the panel and opening at both ends of the panel.

14. The device of claim 9 wherein the shape of the heat radiating panel is that of a baseboard panel having substantial length along the wall and of limited height.

* * * * *